United States Patent

Grotz

[11] Patent Number: 5,236,671
[45] Date of Patent: Aug. 17, 1993

[54] APPARATUS FOR AMMONIA SYNTHESIS

[75] Inventor: Bernard J. Grotz, Pasadena, Calif.

[73] Assignee: C. F. Braun, Inc., Alhambra, Calif.

[21] Appl. No.: 586,760

[22] Filed: Sep. 24, 1990

[51] Int. Cl.$^5$ ............................ C01C 1/00; F28D 7/02
[52] U.S. Cl. .................... 422/148; 422/198;
422/201; 422/211; 422/240; 165/158
[58] Field of Search ............... 422/148, 198, 201, 191,
422/202, 208, 211, 240; 423/359, 360, 361;
165/158, DIG. 8, 140

[56] References Cited

U.S. PATENT DOCUMENTS

| 1,710,712 | 4/1929 | Reavis | 165/140 |
|---|---|---|---|
| 2,382,255 | 8/1945 | Pyzel | 165/140 |
| 2,762,611 | 9/1956 | Monroe et al. | 423/359 |
| 2,898,384 | 8/1959 | Viriot | 570/255 |
| 3,753,662 | 8/1973 | Pagani et al. | 422/148 |
| 3,851,046 | 11/1974 | Wright et al. | 423/359 |
| 3,892,535 | 7/1975 | Hennel et al. | 165/158 |
| 4,152,407 | 5/1979 | Fuchs | 423/360 |
| 4,294,312 | 10/1981 | Kehrer et al. | 165/134 R |
| 4,510,123 | 4/1985 | Grotz, Jr. | 423/360 |
| 4,554,135 | 11/1985 | Grotz et al. | 422/148 |
| 4,561,496 | 12/1985 | Kehrer | 165/103 |
| 4,576,225 | 3/1986 | Nassauer | 165/101 |
| 4,624,842 | 11/1986 | Grotz, Jr. | 423/360 |
| 4,768,584 | 9/1988 | Kehrer et al. | 165/140 |
| 4,867,959 | 9/1989 | Grotz, Jr. | 423/360 |
| 4,907,643 | 3/1990 | Grotz et al. | 165/1 |

FOREIGN PATENT DOCUMENTS

| 0268808 | 6/1988 | European Pat. Off. |  |
| 711432 | 10/1941 | Fed. Rep. of Germany | 165/158 |
| 2415382 | 10/1974 | Fed. Rep. of Germany | 165/158 |
| 1434754 | 5/1976 | United Kingdom | 165/158 |
| 2089951 | 6/1982 | United Kingdom |  |

OTHER PUBLICATIONS

Chemical Engineers' Handbook, 4th Ed. by Robert H. Perry, Cecil H. Chilton and Sidney D. Kirkpatrick p. 11–10.

Primary Examiner—Robert J. Warden
Assistant Examiner—Christopher Y. Kim
Attorney, Agent, or Firm—Lyon & Lyon

[57] ABSTRACT

An apparatus for the synthesis of ammonia having at least two synthesis reactors in series in which two high temperature heat sink tube bundles are combined in a single shell which is close coupled to the inlet and outlet of a reactor, the second tube bundle being disposed in an interior portion of the exchanger shell inside of the first tube bundle, the first tube bundle being connected for flow from its tubes to the reactor inlet, the second tube bundle being connected for flow to its tubes from the reactor outlet.

12 Claims, 2 Drawing Sheets

APPARATUS FOR AMMONIA SYNTHESIS

BACKGROUND OF THE INVENTION

1. Field of the Invention

This invention relates to an apparatus for the synthesis of ammonia. More particularly, this invention provides an apparatus for an ammonia synthesis process in which the energy released in the process is recovered at high temperature levels in a system which is more compact and less costly than with previously known types of apparatus.

2. Description of the Prior Art

Ammonia is produced commercially today by continuous processes which involve the seemingly straightforward reaction between stoichiometric amounts of nitrogen and hydrogen:

$$N_2 + 3H_2 \rightarrow 2NH_3$$

In practicing such processes, a gaseous mixture containing nitrogen and hydrogen is passed sequentially over one or more catalyst beds containing, for example, granular iron or promoted iron catalyst, at elevated pressure and temperature.

Commercial processes are known for carrying out the synthesis over a wide range of pressures, from about 20 to 1000 atmospheres, but most modern commercial processes employ pressures in range of about 60 to 300 atm.

The reaction is exothermic—heat is released as the reaction proceeds, therefore the equilibrium conversion of hydrogen and nitrogen to ammonia is greater at lower temperatures. However, at any given gas composition, the reaction rate velocity constant decreases as the temperature is lowered, so that as a practical matter, the temperature must be maintained at a high enough level to permit the synthesis of acceptable quantities of ammonia product in a reasonably short time. This is true even with the acceleration of the reaction rate achieved with a catalyst.

For minimum catalyst volume, the temperature at each point in catalyst would be controlled at the level at which the reactivity and the equilibrium driving force corresponding to the composition at that point are balanced to achieve the maximum rate of ammonia formation. In such an ideal system, both the temperature and the rate of heat removal would be highest at the inlet of the catalyst, both gradually decreasing to lower levels at the outlet.

Older commercial processes attempted to approach these conditions for minimum catalyst volume as much as practical, with varying degrees of success, by imbedding indirect heat transfer surfaces throughout the catalyst bed by which heat could be transferred by indirect heat exchange to a cooling fluid such as incoming feed gas or other cooling media.

It was eventually discovered, however, especially for larger plants, that as a practical matter the costs of fabrication, maintenance, catalyst loading, and catalyst unloading of such systems was unnecessarily costly, and that a more practical and more economical approach is to employ a series of two or more adiabatic beds with successively lower outlet temperatures. Most modern processes employ the latter approach.

In such processes, as the gaseous mixture passes through each bed, the ammonia concentration increases as hydrogen and nitrogen react, and the temperature of the gas is also increased by the exothermic heat of reaction, until the ammonia concentration and temperature approach equilibrium conditions.

To achieve further conversion, the gaseous mixture is withdrawn from the first bed, cooled to a lower temperature at which the equilibrium concentration of ammonia is greater, and then introduced to the second bed, where the phenomena occurring in the first bed are repeated, except at higher ammonia concentration levels and lower outlet temperatures. In some processes, additional beds are employed in the same manner to obtain still greater ammonia concentrations.

Two general methods are used to cool the gas leaving a bed before sending it to another bed. One method is to quench directly the gas leaving a bed by mixing with it a part of the feed gas which, because of its lower temperature, results in a mixture of a lower temperature than that of the effluent before mixing. The other is to cool the gas by indirect heat exchange with another fluid.

In some processes all the catalyst beds and all the devices for cooling the gases leaving the beds are contained in a single pressure vessel. In other processes, each bed and each cooling device is contained in a separate pressure vessel. And in still other processes at least one of two or more pressure vessels may contain a combination of two or more of these components.

In many designs, the catalyst and sometimes also one or more exchangers are held in a cartridge, basket, or other type of container which is disposed inside a pressure shell, the pressure shell being shielded from the hotter catalyst bed and the high temperature of the effluent gas passing the colder feed gas through an annular space between the internal container and the pressure shell. In such designs the inlet and outlet connections are often located at the same end of the pressure shell, usually at the bottom end. Examples of such designs are described in U.S. Pat. Nos. 3,851,046 and 3,721,532 of Wright, et al., the disclosures of which are specifically incorporated herein by reference.

U.S. Pat. No. 4,554,135 of Grotz, et al., the disclosures of which are specifically incorporated herein by reference, describes a means for close coupling the inlet and outlet connections at the bottom of a reactor to a horizontally-disposed heat exchanger used to transfer heat from the hotter reactor effluent gas to the colder reactor feed gas in a manner which avoids the exposure of the reactor pressure shell, the exchanger pressure shell, or the pressurized connecting conduit to the high temperatures of the catalyst bed and the reactor effluent gas.

A number of processes and apparatus arrangements are known in which an adiabatic reactor is preceded by a heat exchanger in which the effluent of a preceding reactor is cooled by indirect heat exchang with high temperature boiling water to generate high pressure steam and followed by a similar high pressure steam generator for cooling the effluent of that reactor. Several examples are described in U.S. Pat. Nos. 4,510,123, 4,624,842, 4,744,966, and 4,867,959 of Grotz, the disclosures of which are specifically incorporated herein by reference.

In FIG. 2 of Grotz '959, for example, the third reactor, catalytic converter 238, is preceded by high pressure steam generator 234, recovers energy from the effluent of the preceding reactor, catalytic converter 228, and is followed by high pressure steam generator 246, which recovers energy from the effluent of catalytic converter 238. The two streams of high pressure steam generated in steam generators 234 and 238 are combined into a single stream in conduit 230.

In carrying out a process having the steps described above with conventional known apparatus, each high pressure steam generator is a separate heat exchanger, each with its own pressure shell, feedwater supply system, level control system, safety relief system, blowdown system, and other instrumentation, each entailing duplicate costs. A need exists therefore for a practical and economical means of eliminating this duplication of costs and complexity for performing the corresponding duplicate in comparison to those required with known apparatus.

SUMMARY OF THE INVENTION

This invention is an apparatus for the synthesis of ammonia from a gaseous mixture containing hydrogen and nitrogen in a system having at least two synthesis reactors in series in which at least one of the reactors downstream of the first reactor is preceded by a high pressure steam generator which recovers energy from the effluent of the preceding reactor and is also followed by high pressure steam generator which similarly recovers energy from the effluent of that reactor.

The nature and substance of the invention is best understood by reference to FIG. 1, which shows a preferred embodiment of the process of the present invention. This embodiment is applicable to a continuous ammonia synthesis process in which a synthesis gas mixture containing hydrogen and nitrogen is passed sequentially through two catalyst beds containing ammonia synthesis catalyst at relatively high pressure and temperature. The feed gas to the first bed is heated by heat exchange with the effluent from the first bed. The effluent from the first bed, after being partially cooled by heat exchange with the feed gas to the first bed, is cooled further by heat exchange with boiling water in a high pressure steam generator. The effluent from the second bed flows directly to a second high pressure steam generator.

In this invention the two tube bundles of the two high pressure steam generators are disposed in a single pressure shell in a novel arrangement in which the second tube bundle is disposed inside of the first tube bundle which permits the single shell to serve both steam generators, which permits the use of a close coupling means similar to that described in Grotz '135 for both exchangers, which permits full independent control of the temperatures of the gases leaving both steam generators, and which eliminates the duplication of pressure shells, feedwater supply systems, level control systems, safety relief systems, blowdown systems, other instrumentation, and the duplicate costs associated therewith in an economical manner.

An object of this invention is to provide a novel and more economical apparatus for use in the synthesis of ammonia.

Another object of this invention is to provide ammonia synthesis apparatus for use in processes in which a synthesis reactor is both preceded and followed by high pressure steam generators, which apparatus permits the use of close coupling, permits independent temperature controls, and eliminates duplicate features and costs heretofore associated with two such steam generators.

These and other objects, as well as the nature scope and utilization of the invention, will become readily apparent to those skilled in the art from the following description, the drawings and the appended claims.

DETAILED DESCRIPTION OF THE INVENTION

Figure 1:
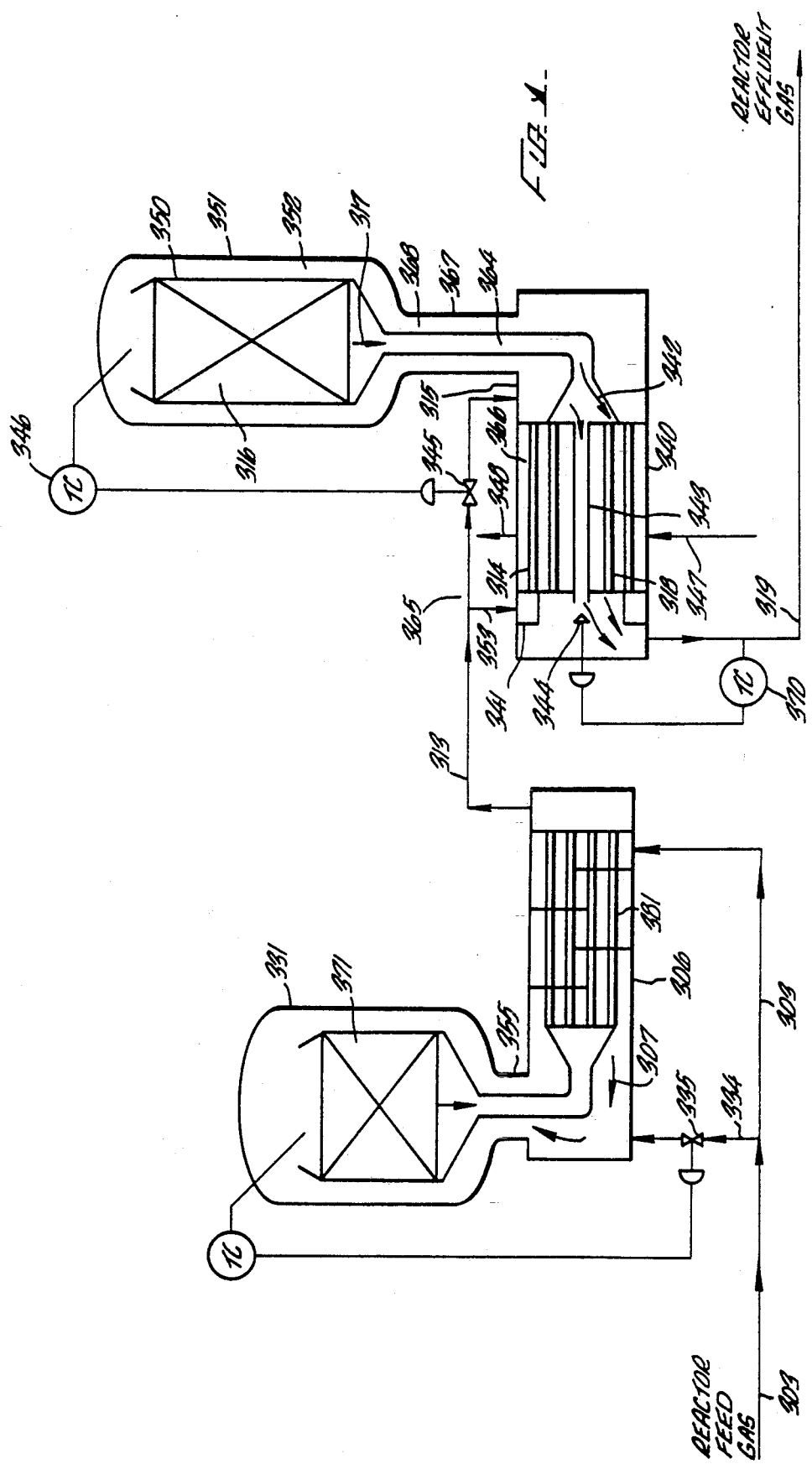

A preferred embodiment of the invention is shown in FIG. 1. The apparatus is best described together with a process in which it may be utilized, as follows. In the basic process to which this embodiment is applied feed gas is sequentially heated in a first bed feed-effluent heat exchanger, reacted in a first catalyst bed, cooled by indirect heat exchange with the feed to the first bed in feed effluent heat exchanger, cooled further in a high pressure steam generator, reacted further in a second catalyst bed, and cooled again in a second high pressure steam generator.

Referring to FIG. 1, ammonia synthesis reactor feed gas containing hydrogen and nitrogen, and previously heated in steps not shown, is introduced into the system through a conduit 303 into a first stage ammonia synthesis apparatus such as that described in Grotz '135, comprising a first vertical adiabatic synthesis reactor 331 of the type described in Wright '532, the lower end of which is connected to a feed-effluent gas-gas heat exchanger 306 by a close coupling means 355 such as that described in Grotz '135 for use in a process such as described in U.S. Pat. No. 4,921,684, to Grotz et al., the disclosure of which is specifically incorporated herein by reference. The feed gas from conduit 303 is passed into a shellside 361 of gas-gas heat exchanger 306.

A part of the feed gas from conduit 303 bypasses gas-gas heat exchanger 306 through a conduit 334, passing through a temperature control valve 335 into a shellside outlet channel 307 of gas-gas heat exchanger 306, where it recombines with the feed gas from shellside 361. The thus recombined feed gas then flows sequentially through the first stage apparatus where the gas is partially converted to ammonia in first catalyst bed 311, cooled in gas-gas heat exchanger 306, and passed out of gas-gas heat exchanger 306 into a conduit 313.

The thus-cooled gas is then passed through conduit 313 to a first tube bundle 314, where heat is recovered from the gas by indirect heat transfer to water boiling in a shellside 366 of high pressure steam generator 365 to generate high pressure steam, thereby cooling the gas. First tube bundle 314 is disposed in a peripheral portion of a pressure shell 340 of high pressure steam generator 365, which is positioned horizontally below a vertical cylindrical second reactor pressure shell 351 having disposed therein a catalyst holder 350 containing a second catalyst bed 316 in a manner such as that described in Wright '532. High pressure steam generator 365 is connected to second reactor pressure shell 351 and catalyst holder 350 by a close coupling means 367 such as that described in Grotz 135.

A part of the feed gas from conduit 313 bypasses first tube bundle 314, passing through a control valve 345 into a tubeside outlet channel 315 of high pressure steam generator 365, where it recombines with the feed gas from tube bundle 314. The thus recombined gas then flows sequentially through an annular space 368 of a close coupling means 367, an annular space 352 between second reactor pressure shell 351 and catalyst holder 350, and then into the top of second catalyst bed 316.

The temperature of the feed to second catalyst bed 316 is controlled by temperature controller 346 which continually adjusts control valve 345 to maintain the feed gas to the second catalyst bed 316 at the desired temperature. In second catalyst bed 316, additional hydrogen and nitrogen is converted to ammonia, and the temperature of the gas is raised by the heat of reaction.

The further converted gas leaving second catalyst bed 316 passes through an inner conduit 369 of close coupling means 367 into a second tube bundle 318, where additional heat is recovered from the effluent of second catalyst bed 316 by indirect heat transfer to water boiling in shellside 366 of high pressure steam generator 365 to generate high pressure steam, thereby cooling the gas. Second tube bundle 318 is disposed in an interior portion of pressure shell 340 of high pressure steam generator 365, inside of first tube bundle 314. The number of tubes in the first tube bundle 314 can advantageously be smaller than the number of tubes in the second tube bundle 318 to allow the amount of tubes used in the first tube bundle 314 to be determined in proportion to the heat transfer load independent of the number of tubes used in the second tube bundle 318. The cooled gas leaving second tube bundle 318 is then passed through a conduit 319 to further known processing steps, not shown.

A flanged ring partition 341 disposed in the end of shell 340 away from the close coupled end separates the cooled first catalyst bed effluent stream entering first tube bundle 314 from conduit 313 from the cooled second bed effluent stream leaving the shell 340 in conduit 319. A conical connector 342 disposed in the close-coupled end separates the second bed feed gas leaving the shell 340 in channel 315 from second bed effluent gas entering second tube bundle 318 from conduit 369.

A part of the second bed effluent gas from conduit 369 may be bypassed around second tube bundle 318 through a single pipe 343 positioned along the center axis of second tube bundle 318. A conical plug 34 positioned at the outlet of bypass pipe 343 serves as a control valve and is continually adjusted by a temperature controller 370 to maintain the temperature of reactor effluent gas in conduit 319 at the desired temperature. In the embodiment of FIG. 1, the bypass system for second tube bundle 318 is optional. However, if the gas in conduit 319 is to go to another catalyst bed, then a means such as the bypass system for second tube bundle 318 is needed to control the temperature of the feed to the next catalyst bed. Furthermore, the described bypass system provides novel benefits over a simple bypass device like a butterfly valve since for certain abnormal conditions, such as during catalyst reduction, it allows the flow to be completely shut off.

Boiler water is introduced through a conduit 347 into shell 340, and high pressure steam is passed out of shell 340 through a conduit 348 to a steam system, not shown.

The novel arrangement of the first and second tube bundles 314 and 318 in the high pressure steam generator 365 of the present invention greatly reduces the complexity and the cost of the high pressure steam generator 365. For example, in many ammonia synthesis systems the heat transfer load on the second tube bundle 318 would be more than twice that on the first tube bundle 314. By deliberately employing half the number of tubes in the first tube bundle 314 than in the second tube bundle 318 in accordance with the present invention, rather than employing an equal number of tubes in both tube bundles as would be required if the tubes were disposed in an alternating arrangement in a manner as is described in U.S. Pat. No. 4,768,584, the first tube bundle will not be greatly oversized. By avoiding such oversizing, the present invention not only reduces the cost and complexity of the high pressure steam generator 365, but it also reduces the amount of gas which must be bypassed and the difficulty of controlling the temperature of the gas to the second reactor.

It has also been discovered that the high pressure steam generator 365 of the present invention can operate with only two tube sheets and that the tube sheets and tube inlets can be protected from the high temperature of the inlet gas without sacrificing the advantages of concentric tube bundles with tube counts set independently of each other and in proportion to the heat transfer load. By providing insulation means to insulate the outer face of the tube sheets and the inlet ends of the tubes from the high temperature of the incoming gas, the present invention does not have to use austenitic steel which is not only more susceptible than ferritic steel to water side corrosion, but also more costly. Thus, by way of example only, the outer surface of a tube sheet used in the high pressure steam generator 365 may be covered with a refractory insulation whereas the inlet ends of the tubes may be protected by a ferrule of refractory or metallic material resistant to the gas conditions, the ferrule extending into the tube for a short distance to the point at which the tube is cooled by the cooling fluid to a temperature at which nitriding problems are avoided. The space between the ferrule and the tube may be further insulated by a stagnant gas gap or a layer of insulating paper wrapped around the ferrule.

While a preferred embodiment of the process of the present invention has already been described, many changes and modifications in the preferred embodiment are possible and would be obvious to one of ordinary skill in the art working from the disclosure of the present invention. For instance, and without intending to be limiting or all inclusive, it is specifically contemplated that other embodiments of the invention include the following.

The invention is applicable not only to the process of the example described above, but also to any other process having at least two synthesis reactors in series in which at least one of the reactors downstream of the first reactor is preceded by a high pressure steam generator which recovers energy from the effluent of the reactor, and is also followed by a high pressure steam generator which similarly recovers energy from the effluent of that reactor. Other examples are the system shown in FIG. 1 of Grotz '123 comprising synthesis converter C and high pressure steam generators 126 and 128, the system shown in FIG. 2 of Grotz '966 comprising synthesis converter 238 and high pressure steam generators 234 and 246, the system shown in FIG. 2 of Grotz '959 comprising synthesis converter 238 and high temperature heat sinks 234 and 246, the process recited in claim 27 of Grotz '959 in which the first reactor is a quench type reactor(any reactor in which colder gas is introduced at an intermediate point in the catalyst to reduce the temperature of the catalyst gas), processes in which the reactor to which the process is applied or any other reactor in the process is a quench type reactor, and any process in which the reactor and high pressure steam generators to which the invention is applied are preceded or followed by any combination of other reactors and/or heat exchangers. Thus, by way of example only, the reactor effluent gas leaving second high temperature heat sink exchanger 318 in conduit 319 could be passed through another conduit to a third vertical diabatic synthesis reactor of the type described in Wright '532.

While the detailed description of the invention is based on axial flow through the catalyst bed as described in Wright '532, other flow patterns can be used such as a radial flow or combined axial-radial flow.

While the use of boiling water in high pressure steam generators is preferred, the invention may use any other high temperature heat sink cooling medium such as boiler feedwater, a chemical cooling medium such as Dowtherm, or a molten salt cooling medium.

While preferred means of temperature control are shown, temperatures may be controlled by any of a number of other means known to those skilled in the art.

The tubes of first tube bundle 314 need not be, but preferably are, of the same diameter as the tubes in second tube bundle 318.

The number of tubes in first tube bundle 314 is not the same as, and normally less than, the number of tubes in the second tube bundle 318. The number of tubes is determined by heat transfer and pressure drop considerations.

Figure 2:
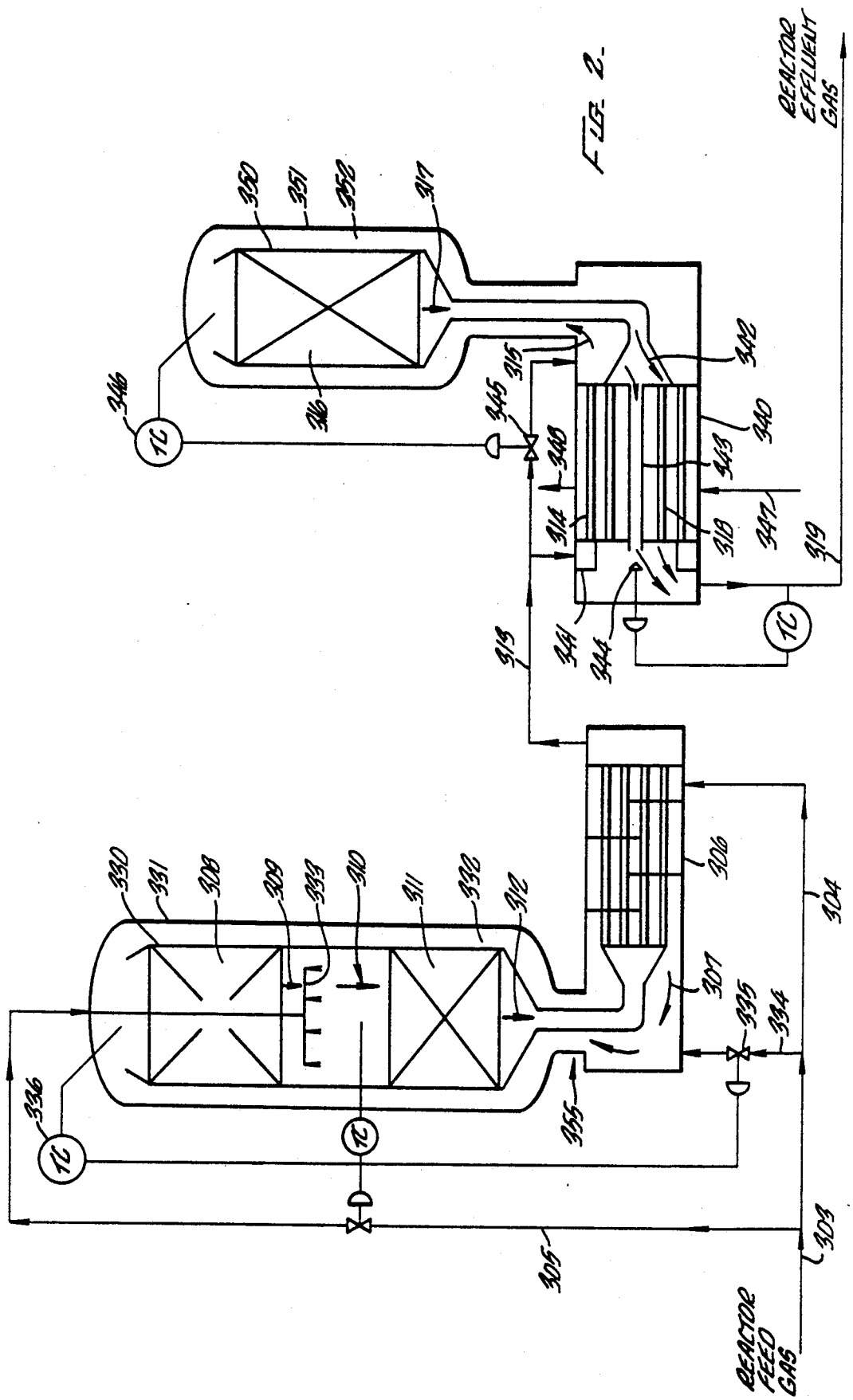

To further illustrate the present invention, another embodiment of the invention is shown in FIG. 2 which includes two catalyst beds in series, with a quench means between the two catalyst beds, in one catalyst holder disposed in a single pressure vessel or shell 331. The apparatus in common with FIG. 1 is numbered the same as in FIG. 1 and its description will not be repeated.

The feed gas in conduit 307 first flows upward through annulus 332 between pressure shell 331 and basket 330 and then enters the top of the first catalyst bed 308 and then flows downward through the first and second catalyst beds 308 and 311 in series.

The desired temperature of the feed to the first catalyst bed 308 is maintained by a temperature control means in which a quench part of the reactor feed gas in conduit 303 is bypassed around second heat exchanger 306 through a conduit 334 and a control valve 335, which is continually adjusted by temperature controller 336 to maintain the feed gas to the first catalyst bed 308 at desired temperature levels.

The quench gas in conduit 305 is passed through the top of shell 331 and first catalyst bed 308 to quench gas distributor 333 disposed between the first and second catalyst beds 308 and 311 for distributing the quench gas across the cross section of the catalyst holder 330 and for mixing the quench gas from conduit 305 with effluent from first catalyst bed 308 in conduit 309 to form the feed gas to the second catalyst bed 311 in conduit 310.

The quench gas distributor 333 could be replaced by other quench gas means which will allow the second part of the feed gas to quench the effluent gas from the first catalyst bed. Thus, by way of example only, the quench gas might not be distributed across the cross section of the basket 330 or a quench device could be located at an intermediate position in the first catalyst bed for introducing a quench part of feed gas into the catalyst bed and mixing it with reacting gases in the catalyst bed. Further, the conduit 305 might pass the quench gas through a side of the shell 331 and it might or might not pass through the first catalyst bed 308.

To further describe the embodiment shown in FIG. 2, a preferred process using the apparatus illustrated in FIG. 2 is described as follows.

Ammonia synthesis reactor feed gas containing hydrogen and nitrogen in a three to one volume ratio, 4.0 volume % inert gases, and 3.5 volume % ammonia, and having a pressure of about 150 atm., is introduced into the system through a conduit 303 at a temperature of 280° C. Conduits 304 and 305 divide the feed gas into two approximately equal parts whose ratio is continuously adjusted by a temperature control means to maintain the gas passed into the first catalyst bed 308 at a desired temperature. The first part is passed through conduit 304 to a heat exchanger 306 and heated therein to a temperature of about 380° C. The thus-heated gas is then passed through a conduit 307 to a first catalyst bed 308 in which the ammonia concentration increases to about 11.7% and the exothermic heat of the ammonia-forming reaction causes the temperature to rise to about 512° C.

The partially converted gas leaving catalyst bed 308 through a conduit 309 is combined and mixed, that is to say quenched, with the second part of the feed gas from conduit 305 in a conduit 310, resulting in a temperature of the combined gases after mixing of about 380° C., at which the combined gases are passed to a second catalyst bed 311, where again the ammonia concentration increases, this time to about 14.1%, the heat of reaction causing a temperature rise in the gas to about 491° C. The further partially converted gas leaving second catalyst bed 311 through a conduit 312 is then cooled in second heat exchanger 306 to a temperature of about 448° C. The thus-cooled gas is then passed through a conduit 313, and a portion thereof is passed to a high pressure steam generator 314, where heat is recovered from the gas by indirect heat transfer to water boiling at about 100 atm. and about 312° C., thereby cooling the gas to about 325° C. The remaining portion of the gas from conduit 313 is by-passed around high pressure steam generator 314 and mixed with the cooled portion to form a combined feed entering a third catalyst bed 316 at a temperature of 380° C., where once again the ammonia concentration increases, this time to about 19.2%, the heat of reaction causing a temperature rise in the gas stream to about 453° C. The temperature of the feed to the third catalyst bed 316 is controlled by a second temperature control means.

The still further partially converted gas leaving third catalyst bed 316 through a conduit 317 is then cooled in a second high pressure steam generator 318, where additional heat is recovered as in first high pressure steam generator 314, thereby again cooling the gas to about 325° C. The thus-cooled gas is then passed through a conduit 319 to further known processing steps, not shown, for further recovery of heat and for separation of ammonia product from the gas, after which the remaining gas is recycled and combined with fresh makeup gas to form the reactor feed gas.

Several changes and modifications in the process are possible and would be obvious to one of ordinary skill in the art working from the disclosure of the present invention. For instance, and without intending to be limiting or all-inclusive, it is specifically contemplated that other changes include the following.

The pressure of the system is more than 100 atm., preferably 125 to 175 atm.

The ratio of hydrogen to nitrogen in the reactor feed gas is 1.5 to 4.0, preferably 2.5 to 3.5.

The temperature of the reactor feed gas entering the gas-gas heat exchanger is 250° C. to 310° C., preferably 270° C. to 290° C.

The temperature of the gas entering any adiabatic catalyst bed is 350° C. to 400° C., preferably 380° C. to 400° C.

The temperature of the gas leaving any adiabatic catalyst bed is 410° C. to 540° C., preferably 420° C. to 530° C.

The concentration of inert gases in the reactor feed gas is 0% to 25%, the concentration depending on the inerts in the fresh makeup gas and system operating conditions.

The concentration of ammonia in the reactor feed gas is 0% to 25%, preferably 2% to 10%.

The ratio of quench gas to first bed inlet gas is 0.1 to 0.8, preferably 0.4 to 0.6.

A high temperature heat sink exchanger generates high pressure steam at a pressure of 40 to 160 atm., preferably at 100 to 125 atm., or superheats high pressure steam, or heats feedwater to high pressure steam generators.

The reactor effluent gas leaving second high temperature heat sink exchanger 318 in conduit 319 is passed to one or more additional adiabatic catalyst beds each followed by an additional high temperature heat sink exchanger, arranged in the same manner as the third bed and second high temperature heat sink exchanger described above.

An additional quench point and an additional bed is added after the second bed, so that in a system with four beds, the effluents of the first two beds are cooled by direct quench with feed gas, and the effluent of the third bed is cooled first by indirect heat exchange with feed gas, then by indirect heat exchange with a high temperature heat sink fluid.

As the term adiabatic bed is used herein, each zone of catalyst between any two places in the catalyst where a significant amount of either heat or gas is added or removed is considered a separate adiabatic bed. Leakage or other minor or incidental transfer of either heat or gas, as for example heat loss through a catalyst containment wall, or minor or incidental portions of catalyst not within such a zone, are disregarded for the purpose of defining a separate adiabatic bed. Whether or not a given bed is divided into two or more parallel beds operating at about the same conditions is also disregarded.

The term conduit as used herein refers to any fluid passage, without regard as to whether it is a duct, a pipe, a passage between two catalyst beds that are physically separated within a pressure vessel, or the catalyst interstices through which the gas passes between adiabatic beds, as defined above, which are not physically separated.

It will be readily apparent to those skilled in the art that still further changes and modifications in the actual implementation of the inventions described herein can readily be made without departing from the spirit and scope of the invention as defined by the following claims. Accordingly, it is not intended that the scope of the invention be limited except as set forth by the lawful scope of the following claims.

What is claimed is:

1. Apparatus for the synthesis of ammonia, comprising:
   a first vertical synthesis reactor comprising a first reactor shell and a first catalyst bed contained in a first catalyst holder positioned within and spaced apart from the first reactor shell to provide a first annulus between the first catalyst holder and the first reactor shell to allow feed gas to enter the first catalyst bed;
   a second vertical synthesis reactor comprising a second reactor shell and a second catalyst bed contained in a second catalyst holder positioned within and spaced apart from the second reactor shell to provide a second annulus between the second catalyst holder and second reactor shell to allow feed gas to enter the second catalyst bed;
   a gas-gas heat exchanger;
   a first coupling means for coupling the bottom end of the first reactor to the gas-gas heat exchanger, the first coupling means having a first conduit between the fist annulus and the gas-gas heat exchanger for passage of feed to the first catalyst bed and a second conduit to pass effluent from the first catalyst bed to the gas-gas heat exchanger;
   a second heat exchanger comprising an exchanger shell having disposed therein a first tube bundle and a second tube bundle disposed in an interior portion of the exchanger shell inside of the first tube bundle;
   a second coupling means for coupling the bottom end of the second reactor to the second heat exchanger, the second coupling means having a third conduit between the second annulus and the outlet of the first tube bundle for passage of feed to the second catalyst bed and a fourth conduit to pass effluent from the second catalyst bed to the second tube bundle; and
   a fifth conduit to pass effluent from the gas-gas heat exchanger to the inlet of the first tube bundle.

2. An apparatus as recited in claim 1, further comprising:
   a first tube sheet disposed within the exchanger shell which holds the inlet ends of the tubes of the first tube bundle and the outlet ends of the tubes of the second tube bundle;
   a second tube sheet disposed within the exchanger shell which holds the outlet ends of the tubes of the first tube bundle and the inlet ends of the tubes of the first tube bundle; and
   an insulation means to insulate the inlet ends of the tubes within the tube sheets of the first and second tube bundles from the high temperature of incoming gas.

3. An apparatus as recited in claim 2, wherein the first and second tube sheets and the tubes of the first and second tube bundles consist of ferritic steel.

4. An apparatus as recited in claim 1 wherein the gas-gas heat exchanger shell is disposed horizontally relative to the first reactor shell.

5. An apparatus as recited in claim 1 wherein the first tube bundle has fewer tubes than the second tube bundle.

6. An apparatus as recited in claim 1 wherein the high temperature heat sink exchanger shell is disposed horizontally relative to the second reactor shell.

7. An apparatus as recited in claim 1, further comprising a bypass system with a temperature control valve for allowing a part of the feed to the first catalyst bed to bypass the gas-gas heat exchanger through a bypass conduit extending from a source of the feed gas entering the gas-gas exchanger to the first conduit.

8. An apparatus as recited in claim 1, further comprising a bypass system with a temperature control valve for allowing a part of the feed to bypass the first tube bundle through a bypass conduit extending from the fifth conduit to the third conduit.

9. An apparatus as recited in claim 1, further comprising a third vertical synthesis reactor comprising a third reactor shell and a third catalyst bed contained in a third catalyst holder positioned within and spaced slightly apart from the third reactor shell to provide a third annulus between the third catalyst holder and third reactor shell to allow feed gas to enter the third catalyst bed and a sixth conduit to pass effluent from the second tube bundle to the third catalyst bed.

10. An apparatus as recited in claim 9, further comprising a bypass system with a control valve continually adjusted by a temperature controller for the second tube bundle to control the temperature of the effluent from the second catalyst bed leaving the exchanger shell through a bypass conduit extending from the fourth conduit along the center axis of the second tube bundle to the second tube bundle ends distal to their fourth conduit connection.

11. An apparatus as recited in claim 10, wherein the control valve of the bypass system in its fully closed position stops completely the flow of gas through the bypass conduit.

12. Apparatus for the synthesis of ammonia, comprising:
a vertical synthesis reactor comprising a reactor shell and a catalyst bed contained in a catalyst holder positioned within and spaced apart from the reactor shell to provide an annulus between the catalyst holder and the reactor shell to allow feed gas to enter the catalyst bed;
a exchanger comprising an exchanger shell having disposed therein a first tube bundle and a second tube bundle disposed in an interior portion of the exchanger shell inside of the first tube bundle;
a coupling means for coupling the bottom end of the reactor to the exchanger, the coupling means having a first conduit between the annulus and the first tube bundle for passage of feed to the catalyst bed and a second conduit to pass effluent from the catalyst bed to the second tube bundle;
a first tube sheet disposed within the exchanger shell which holds the inlet ends of the tubes of the first tube bundle and the outlet ends of the tubes of the second tube bundle;
a second tube sheet disposed within the exchanger shell which holds the outlet ends of the tubes of the second tube bundle and the inlet ends of the tubes of the first tube bundle;
an insulation means to insulate the inlet ends of the tubes within the tube sheets of the first and second tube bundles from the high temperature of incoming gas;
wherein the first and second tube sheets and the tubes of the first and second tube bundles consist of ferritic steel; and
wherein the first tube bundle has fewer tubes than the second tube bundle.

* * * * *